(12) United States Patent
Trifilo

(10) Patent No.: US 6,686,714 B2
(45) Date of Patent: Feb. 3, 2004

(54) METHOD AND SYSTEM FOR IMPROVED CLOSED LOOP CONTROL OF SENSORLESS BRUSHLESS DC MOTORS

(75) Inventor: Timothy M. Trifilo, Walden, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 10/177,473

(22) Filed: Jun. 21, 2002

(65) Prior Publication Data
US 2003/0234629 A1 Dec. 25, 2003

(51) Int. Cl.[7] .................................................. H02P 6/00
(52) U.S. Cl. .................... 318/439; 318/254; 318/138
(58) Field of Search ................................. 318/254, 439, 318/445, 459, 720, 721, 722, 723, 724, 138

(56) References Cited

U.S. PATENT DOCUMENTS

| | | | | |
|---|---|---|---|---|
| 4,764,711 A | | 8/1988 | Deller | 318/619 |
| 5,206,567 A | * | 4/1993 | Sakurai et al. | 318/254 |
| 5,216,345 A | * | 6/1993 | Eyerly | 318/685 |
| 5,367,234 A | | 11/1994 | DiTucci | 318/254 |
| 5,481,167 A | | 1/1996 | Rohrbaugh et al. | 318/254 |
| 5,672,948 A | * | 9/1997 | Cohen et al. | 318/603 |
| 5,739,650 A | * | 4/1998 | Kimura et al. | 318/254 |
| 5,783,920 A | | 7/1998 | Hahn | 318/500 |
| 5,949,204 A | | 9/1999 | Huggett et al. | 318/254 |
| 5,998,946 A | * | 12/1999 | Kim | 318/254 |
| 6,111,372 A | * | 8/2000 | Nishimura | 318/254 |
| 6,144,198 A | | 11/2000 | Howard et al. | 324/177 |
| 6,163,120 A | | 12/2000 | Menegoli | 318/254 |
| 6,181,093 B1 | * | 1/2001 | Park et al. | 318/254 |
| 6,307,336 B1 | * | 10/2001 | Goff et al. | 318/254 |
| 6,462,491 B1 | * | 10/2002 | Iijima et al. | 318/254 |

* cited by examiner

Primary Examiner—Robert Nappi
Assistant Examiner—Eduardo Colon-Santana
(74) Attorney, Agent, or Firm—Floyd A. Gonzalez; Cantor Colburn LLP

(57) ABSTRACT

A method for electronically commutating a motor having a plurality of phase windings associated therewith is disclosed. In an exemplary embodiment, the method includes sensing a back electromotive force (BEMF) generated by each of the phase windings, and scaling the magnitude of the sensed BEMF values for each of the phase windings to a normalized value to produce gain corrected BEMF signals. The gain corrected BEMF signals are then used to determine a rotor position of the motor.

14 Claims, 3 Drawing Sheets

METHOD AND SYSTEM FOR IMPROVED CLOSED LOOP CONTROL OF SENSORLESS BRUSHLESS DC MOTORS

BACKGROUND

The present invention relates generally to electronically commutated DC motors (i.e., brushless DC motors) and, more particularly, to a method and system of improved closed loop control of sensorless brushless DC motors.

Brushless direct current motors are well known in the art. The phase windings therein are sequentially energized at appropriate times so as to produce a rotating magnetic field relative to a permanent magnet rotor. The timing of this sequential energization is a function of the location of the permanent magnetic rotor with respect to the particular phase winding that is to be energized. Various means have been heretofore used to sense the position of the permanent magnet rotor relative to the phase windings. These have included optical sensors and Hall effect devices that feed a position signal to switching logic that selectively switches power on and off to the respective phase windings. However, such sensing devices add cost and complexity to a system, and may moreover require maintenance from time to time to assure continued proper operation. In certain high flux/power applications, such as those employing 350 volt motors, the Hall sensors are a common point of failure.

Thus, as a result of the drawbacks of sensor devices, attention has also been focused on sensorless systems that are not based on any direct sensing of the rotor position itself. Generally speaking, sensorless systems are used to measure the effect of the back electromotive forces (BEMF) produced in the energized windings by a rotating rotor. For example, in a trapezoidal three-phase brushless DC motor (BLDC), the phase currents are applied in a bipolar fashion; that is, while two of the three phases are driven, the other is de-energized. The transition of a phase winding to a neutral point determines the instant in time when (30 electrical degrees later) the control circuitry energizes the next pair. Accordingly, the control circuitry of a sensorless BLDC motor must have information regarding the neutral voltage of the motor phase windings.

The neutral voltage of a three-phase motor may be measured either directly or indirectly. For a WYE wound motor, a center tap can be directly connected to the neutral point of the motor windings (i.e., the common point of the three phase coils schematically arranged similar to the letter "Y"). However, for a delta wound motor, there is no neutral point since the phase windings are configured in a triangle arrangement. Thus, an indirect method of measuring the neutral voltage is generally preferred, since it is applicable to either delta or WYE wound motors, and does not result in additional costs in manufacturing additional center taps for the WYE motors. Such an indirect method takes advantage of the fact that, at any given instant in time, the neutral voltage of a brushless machine with trapezoidal BEMF is the sum of the three phase voltages divided by three. As such, the system need only sense the voltages across each of the three phase windings to indirectly determine the neutral voltage One shortcoming of this BEMF sensing technique, however, stems from the fact that the BEMF is directly proportional to the motor speed. Once the motor reaches a sufficient speed, the generated BEMF will be of sufficient magnitude to be detected for closed loop control of the motor. Prior to that time, conventional sensorless motor drives typically accelerate the motor in an open loop mode, wherein the commutation signals are applied at a rate designed to approximate the acceleration characteristics of a given motor/load combination. Unfortunately, the inability to precisely detect BEMF values at low speeds can lead to rotor position inaccuracies, and possibly even loss of synchronization. Accordingly, it is desirable to be able to accurately commutate a brushless machine in a closed loop mode at relatively low speeds.

BRIEF SUMMARY

The foregoing discussed drawbacks and deficiencies of the prior art are overcome or alleviated by a method for electronically commutating a motor having a plurality of phase windings associated therewith. In an exemplary embodiment, the method includes sensing a back electromotive force (BEMF) generated by each of the phase windings, and scaling the magnitude of the sensed BEMF values for each of the phase windings to a normalized value to produce gain corrected BEMF signals. The gain corrected BEMF signals are then used to determine a rotor position of the motor. In a preferred embodiment, an automatic gain control circuit is configured for scaling the magnitude of the sensed BEMF values. The normalized value is based upon about half the value of a DC bus voltage of the motor.

In another aspect, a control circuit for a sensorless brushless motor includes a controller for receiving a sensed back electromotive force (BEMF) generated by each of a plurality of phase windings of the motor. An automatic gain control circuit is used for scaling the magnitude of sensed BEMF values for each of the phase windings to a normalized value to produce gain corrected BEMF signals. The gain corrected BEMF signals are used by the controller to determine a rotor position of the motor.

In yet another aspect, a sensorless brushless motor includes a plurality of phase windings energized by a direct current source. An inverter sequentially applies phase current from the direct current source through selected pairs of phase windings. A controller receives a sensed back electromotive force (BEMF) generated by each of the plurality of phase windings of the motor, the controller providing corresponding control signals to control switching of the inverter. In addition, an automatic gain control circuit is used for scaling the magnitude of sensed BEMF values for each of the plurality of phase windings to a normalized value to produce gain corrected BEMF signals. The corrected BEMF signals are used by the controller to determine a rotor position of the motor.

BRIEF DESCRIPTION OF THE DRAWINGS

Referring to the exemplary drawings wherein like elements are numbered alike in the several Figures.

DETAILED DESCRIPTION

Figure 1:
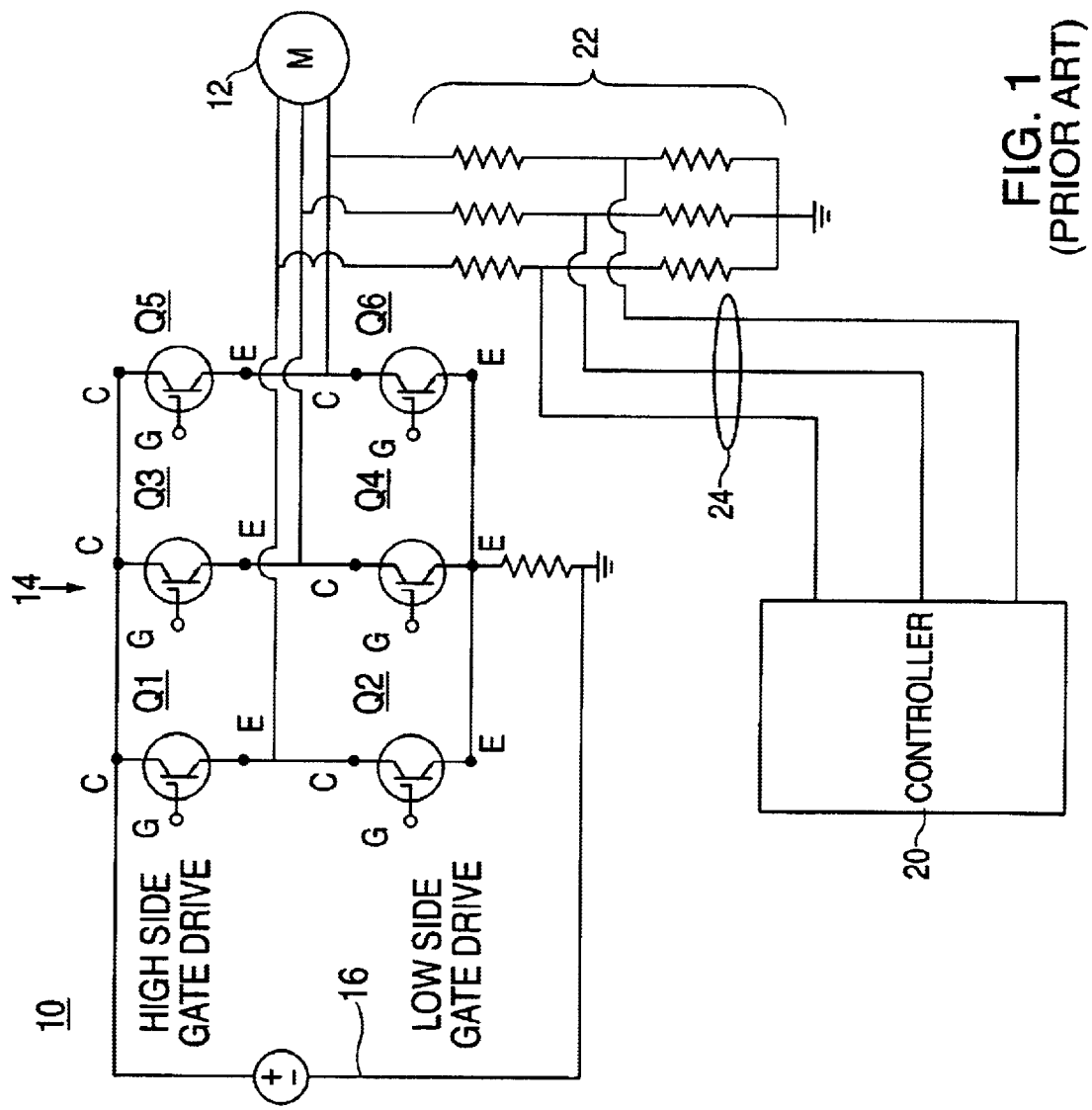
FIG. 1 is a schematic diagram of an existing control circuit for a sensorless brushless DC motor.

Referring initially to FIG. 1, there is shown a schematic diagram of an existing control circuit 10 for a sensorless brushless DC motor 12. As is well known in the art, an inverter 14 is used to electronically commutate the phase currents supplied by a DC bus 16 to the motor 12. For a motor having three phase windings, a conventional inverter 14 includes six individually controlled switching devices, designated in FIG. 1 as Q1 through Q6. In the example shown, the switching devices are insulated gate bipolar transistors (IGBTs); however, other types of solid state switching devices may also be used.

IGBTs Q1, Q3 and Q5 selectively couple each of the three motor phases to the positive side of the DC bus 16, while Q2, Q4 and Q6 selectively couple each of the three motor phases to the negative side of the DC bus 16. Each of the IGBTs are energized and de-energized in a specific sequence as determined by an appropriate control signal applied to the gate terminals thereof. A controller 20, including a microprocessor, is used to generate these control signals for energization and de-energization of the motor windings. As stated previously, one method for accurately determining the appropriate time for applying control signals to the switching devices in a sensorless system is to monitor the BEMF of the de-energized phase. As shown in FIG. 1, the phase voltages are inputted to the controller 20 after being attenuated to a suitable level for the microprocessor logic. In the example illustrated, a voltage divider 22 attenuates the phase voltages of the motor 12 (having a peak phase voltage of about 450 volts) by about a factor of 130, to result in a peak sensed voltage of about 3.3 volts. Thus, attenuated phase voltage signals 24 are inputted directly into the controller 20.

More particularly, in BEMF sensing, the de-energized phase is observed for a neutral transition (i.e., the voltage of the de-energized phase crosses the value of the neutral voltage of the motor). This transition marks the instant in time that is 30 electrical degrees prior to the time when the motor drive energizes the next phase pair. Thus, the controller 20 includes appropriate zero crossing detector circuitry, well known in the art, for detecting the neutral voltage crossings. The controller 20 may also implement the zero crossing detection function in software.

Figure 2:
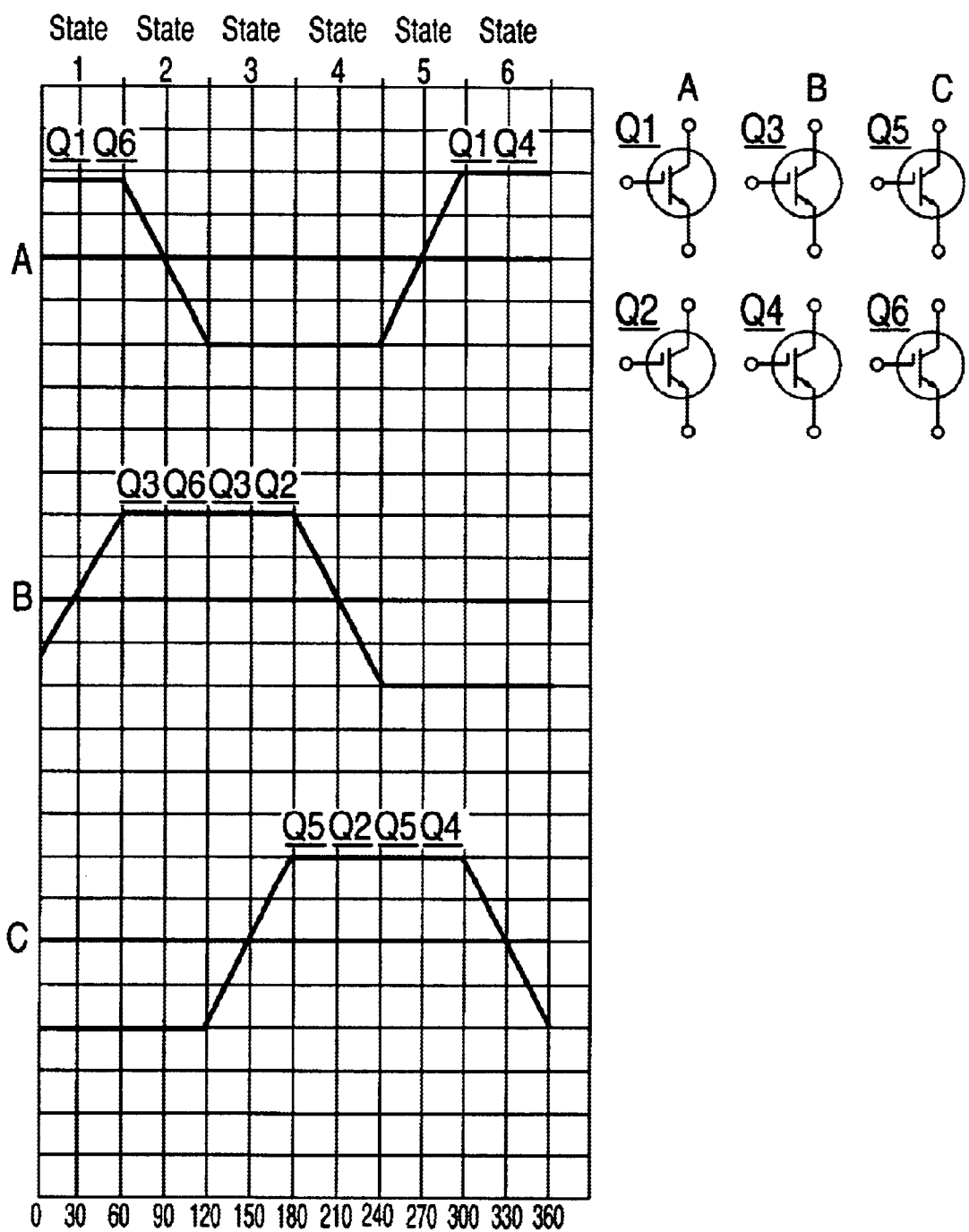
FIG. 2 is a timing diagram illustrating the BEMF waveforms and associated commutation states of the motor of FIG. 1.

Referring now to FIG. 2, a timing diagram illustrates the particular BEMF patterns of each phase of the motor 12, over a commutation cycle of 360 electrical degrees. As is shown, there are six individual commutation "states", separated by 60 electrical degrees, representing which of a particular pair of transistors is energized to produce a directional current in one of the phase windings. In the example illustrated, the phase winding coupled to Q1 and Q2 is designated as phase A, the phase winding coupled to Q3 and Q4 is designated as phase B, and the phase winding coupled to Q5 and Q6 is designated as phase C.

At 30 degrees, transistors Q1 and Q6 are energized (state 1), resulting in a current path from phase A to phase C. The timing of the energization of Q1 and Q6 is triggered by the ascending transition of the voltage of phase B across the neutral point (shown in plot B). At 90 degrees, the voltage of phase A downwardly crosses the neutral point, thus triggering the energization of Q3 and Q6 (state 2) and resulting in a current path from phase B to phase C. Then, at 150 degrees, the voltage of phase C upwardly crosses the neutral point, triggering the energization of Q3 and Q2 (state 3), producing a current path from phase B to phase A.

At 210 degrees, the voltage of phase B downwardly crosses the neutral point, thus triggering the energization of Q5 and Q2 (state 4) and resulting in a current path from phase C to phase A. Next, at 270 degrees, the voltage of phase A upwardly crosses the neutral point, triggering the energization of Q5 and Q4 (state 5), producing a current path from phase C to phase B. Finally, at 330 degrees, the voltage of phase C downwardly crosses the neutral point, triggering the energization of Q1 and Q4 (state 6), producing a current path from phase A to phase B.

As discussed earlier, one significant disadvantage associated with the type of sensorless control demonstrated in FIGS. 1 and 2 stems from the fact that the BEMF generated by a motor is dependent upon the BEMF constant of the motor and the speed of the motor. By way of example, it will be assumed that the motor 12 has a BEMF constant of 100 volts/1000 rpm, and that it is desired to be able to implement closed loop control of the motor 12 by the time the motor speed is accelerated to 300 rpm. At that speed, then, the peak BEMF voltage generated within the phase windings is about 30 volts. After attenuation by the voltage divider 22, the actual peak BEMF voltage seen by the controller 20 at a motor speed of 300 rpm is roughly 230 millivolts.

Assuming further that the controller 20 has, for example, an analog to digital (A/D) resolution of 10 bits (i.e., 1024 discrete voltage levels), then the quantization factor for a 3.3 volt full scale reading translates to 3.222 millivolts per discrete voltage level. Thus, if the peak BEMF voltage is only 230 millivolts, then only 230/3.222 =72 discrete voltage levels out of a possible 1024 levels are used in detecting the BEMF and hence the neutral voltage. Not surprisingly then, it is quite problematic for the controller 20 to calculate precise commutation instants when receiving BEMF signals at a relatively low amplitude. As a result, conventional systems have relied upon open loop control until the motor is accelerated to a sufficient speed such that the amplitude of sensed BEMF voltage is large enough to reliably be used by the controller in calculating commutation instants.

Therefore, in accordance with an embodiment of the invention, there is disclosed a method and system for improved closed loop control of sensorless brushless DC motors. Briefly stated, automatic gain control (AGC) is used to normalize the magnitude of the sensed BEMF voltages in the computation of the neutral voltage, thereby providing improved signal integrity for zero voltage crossing detector circuits. As a result, reliable closed loop control may be initiated at an earlier time when the motor is running at lower speeds.

Figure 3:
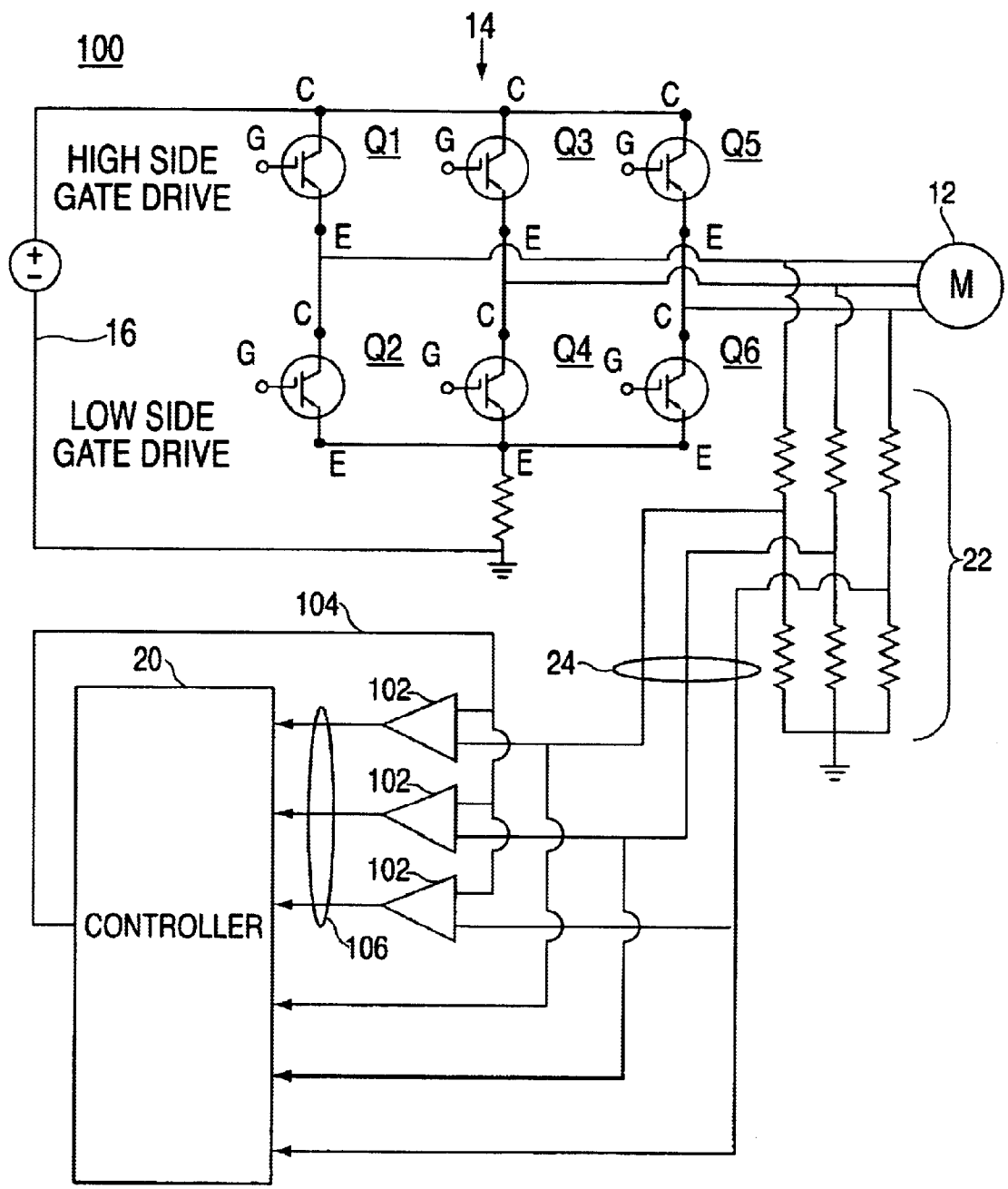
FIG. 3 is a schematic diagram of an improved control circuit for a sensorless brushless DC motor, in accordance with and embodiment of the invention.

Referring now to FIG. 3, there is shown a schematic diagram of an improved control circuit 100 for the sensorless brushless DC motor 12 of FIG. 1. For ease of description, like elements from FIG. 1 are labeled in FIG. 3 with the same reference numerals. As is shown, each of the attenuated BEMF phase voltage signals 24 from the motor 12 is coupled to a corresponding automatic gain control (AGC) circuit 102. Those skilled in the art will recognize that a gain control circuit is one that applies a continuously variable gain to an input signal thereto such that an output therefrom meets a predefined amplitude requirement. For example, televisions use AGC to ensure the color and brightness of a picture are preserved regardless of the signal amplitude.

More specifically, each of the AGC circuits 102 has the attenuated BEMF phase voltage signal 24 of a corresponding phase as a first input thereto and a gain control signal 104 as a second input thereto. The value of the gain control signal 104 is dependent upon the amplitude of the attenuated BEMF voltage signals 24, which are also directly inputted into the controller 20. Again, the amplitude of the attenuated BEMF voltage signals 24 are dependent upon the speed of the motor 12. In this manner, the gain of the gain-corrected output BEMF signals 106 is dynamically controlled such that the BEMF seen by the controller 20 is scaled to a fixed level. Accordingly, the AGC circuits 102 provide a closed loop form of gain control, in that the gain control signal 104 outputted by the controller 20 is fed back as an input to the AGC circuits 102.

Because the same gain is applied to all three phase lines simultaneously, the computation of the neutral voltage (the sum of the three phase voltage divided by three) remains unaffected. Although the normalization of the BEMF values could be scaled to any number of predefined values, it is preferred that the AGC circuits are programmed to force whatever gain is needed to scale the neutral voltage to about half the voltage of the DC bus 16.

Thus configured, the control circuit 100 with automatic gain control allows for the detection of a neutral phase voltage at lower motor speeds since the motor drive start parameters are much less motor speed/load dependent. With the scaled neutral voltage levels being forced to a predefined level, a data acquisition system within the controller 20 is able to attain maximum precision due to the use of all available resolution. As a result, a wider range of motors may be started with less customization of each particular motor drive depending upon specific load/motor combinations. In addition, the control circuit 100 with automatic gain control is particularly suited for pulse width modulation (PWM) control of a motor, in that the techniques described herein are effective in the reconstruction of PWM signals. However, the principles of the present invention embodiment are also applicable to those motors controlled by a linear system.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for electronically commutating a motor having a plurality of phase windings associated therewith, the method comprising:

sensing a back electromotive force (BEMF) generated by each of the phase windings; and scaling the magnitude of sensed BEMF values for each of the phase windings to a normalized value to produce gain corrected BEMF signals using an automatic gain control circuit;

wherein said gain corrected BEMF signals are used to determine a rotor position of the motor.

2. The method of claim 1, wherein said normalized value is based upon about half the value of a DC bus voltage of the motor.

3. The method of claim 1, further comprising:

determining when the magnitude of said gain corrected BEMF signals cross a neutral voltage of the motor; and based upon the determination of said gain corrected BEMF signals crossing said neutral voltage of the motor, applying a control signal to an inverter, said inverter for selectively causing current to be applied to the plurality of phase windings.

4. The method of claim 1, wherein the sensed BEMF values are attenuated values of the BEMF generated by the phase windings.

5. A control circuit for a sensorless brushless motor, comprising:

a controller for receiving a sensed back electromotive force (BEMF) generated by each of a plurality of phase windings of the motor; and an automatic gain control circuit for scaling the magnitude of sensed BEMF values for each of the phase windings to a normalized value to produce gain corrected BEMF signals;

wherein said gain corrected BEMF signals are used by said controller to determine a rotor position of the motor.

6. The control circuit of claim 5, further comprising an attenuator coupled to the phase windings, said attenuator producing said sensed BEMF values that are attenuated values of the BEMF generated by the phase windings.

7. The control circuit of claim 6, wherein said normalized value is based upon about half the value of a DC bus voltage of the motor.

8. The control circuit of claim 6, further comprising:

means for determining when the magnitude of said gain corrected BEMF signals cross a neutral voltage of the motor; and an inverter, operated by a control signal applied by said controller, said inverter for selectively causing current to be applied to the plurality of phase windings based upon a determination by said controller of said gain corrected BEMF signals crossing said neutral voltage of the motor.

9. The control circuit of claim 8, wherein said neutral voltage is computed from voltages of each of said plurality of phase windings.

10. A sensorless brushless motor, comprising:

a plurality of phase windings energized by a direct current source;

an inverter for sequentially applying phase current from said direct current source through selected pairs of phase windings;

a controller for receiving a sensed back electromotive force (BEMF) generated by each of said plurality of phase windings of the motor, said controller providing corresponding control signals to control switching of said inverter; and an automatic gain control circuit for scaling the magnitude of sensed BEMF values for each of said plurality of phase windings to a normalized value to produce gain corrected BEMF signals;

wherein said gain corrected BEMF signals are used by said controller to determine a rotor position of the motor.

11. The motor of claim 10, further comprising an attenuator coupled to the phase windings, said attenuator producing said sensed BEMF values that are attenuated values of the BEMF generated by the phase windings.

12. The motor of claim 11, wherein said normalized value is based upon about half the value of a DC bus voltage of the motor.

13. The motor of claim 11, wherein:

said controller further comprises means for determining when the magnitude of said gain corrected BEMF signals cross a neutral voltage of the motor, and said inverter is operated by a control signal applied by said controller, said inverter for selectively causing current to be applied to said plurality of phase windings based upon a determination by said controller of said gain corrected BEMF signals crossing said neutral voltage of the motor.

14. The motor of claim 13, wherein said neutral voltage is computed from voltages of each of said plurality of phase windings.

* * * * *